UNITED STATES PATENT OFFICE.

GEORG KOERNER, OF LUDWIGSHAFEN, GERMANY, ASSIGNOR TO THE BADISCHE ANILIN AND SODA FABRIK, OF SAME PLACE.

BLACK AZO DYE.

SPECIFICATION forming part of Letters Patent No. 638,127, dated November 28, 1899.

Application filed June 24, 1899. Serial No. 721,766. (Specimens.)

*To all whom it may concern:*

Be it known that I, GEORG KOERNER, doctor of philosophy, a subject of the Grand Duke of Hesse, residing at Ludwigshafen-on-the-Rhine, in the Kingdom of Bavaria, Germany, have invented new and useful Improvements in the Manufacture of New Black Substantive Azo Coloring-Matters for Cotton, (for which application has been filed in Germany December 9, 1898, No. B 23,886,) of which the following is a specification.

My invention relates to the manufacture of a new class of black substantive azo coloring-matters suitable for dyeing cotton without the aid of a mordant.

My new coloring-matters are derived from 1.8 amido-naphthol 4 or 5 monosulfoacid. They are obtained from the said acids by the suitable combination of two tetrazo residues therewith. The said tetrazo residues may be regarded as tetrazo compounds, of which one diazo group is already combined with a component, while the second azo group remains and eventually combines with the amido-naphthol-sulfoacid. Not all such azo dyes which can be obtained by the combination of such tetrazo residues with the said amido-naphthol-sulfoacids are valuable black substantive coloring-matters, such as I desire to claim. In order to obtain my new valuable coloring-matters, the tetrazo residues must be suitably chosen and their combination with the amido-naphthol-sulfoacid effected in a certain definite manner. I have discovered that if the combination of suitably-chosen tetrazo residues be so effected that a tetrazo residue containing one or more basic groups attach itself to the part of the amido-naphthol-sulfoacid residue which contains the amido group, and, further, a tetrazo residue which contains one or more hydroxyl groups attach itself to the part of the amido-naphthol-sulfoacid residue which contains the hydroxyl, then the particular black coloring-matters of excellent quality which I desire to claim are obtained.

My new coloring-matters therefore possess the following general formula:

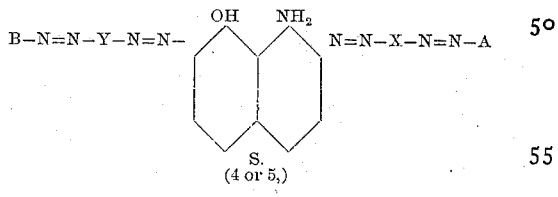

in which $-N=N-X-N=N-A$ is a tetrazo residue containing one or more basic groups and $-N=N.Y-N=N-B$ is a tetrazo residue containing one or more hydroxyl groups.

As an instance of a dye of my new class of dyes I mention that possessing the following formula:

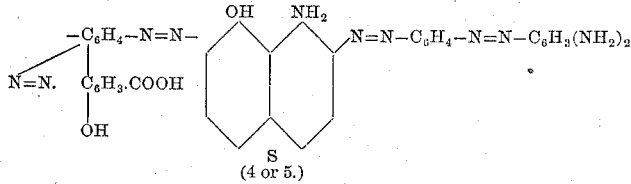

In this the tetrazo residue containing the basic groups is obtained from para-phenylene-diamin-azo-meta-phenylene-diamin, and the tetrazo residue containing the acid groups is obtained from para-phenylene-diamin-azo-salicylic acid.

This coloring-matter yields on cotton excellent black shades, while the isomeric coloring-matter that could be obtained containing the tetrazo residues arranged in the reverse manner to that herein defined and to which I make no claim yields when using the same quantity of coloring-matter only dark-green shades on cotton.

Other members of my new class of coloring-matters are obtained if para-phenylene-diamin-azo-meta-toluylene-diamin be used as the source of the tetrazo residue containing the amido groups instead of para-phenylene-diamin-azo-meta-phenylene-diamin. Also on the other hand, benzidin-azo-phenol, benzidin-azo-salicylic acid, para-phenylene-diamin-azo-phenol, or para-phenylene-diamin-azo-resorcinol can be used instead of the para-phenylene-diamin-azo-salicylic acid as the source of the tetrazo residues containing the acid groups.

In my present application for Letters Patent I desire to claim my new process for the production of black substantive coloring-matters for cotton and the said new coloring-matters themselves generically, and, further, I claim specifically the new coloring-matter whose constitution is above set forth in the formula.

The following example will serve to illustrate the manner in which my invention can be carried into practical effect. Parts are by weight:

Example: Diazotize two hundred and twenty-eight (228) parts of para-phenylene-diamin-azo-meta-phenylene-diamin in the well-known way, using sixty-nine (69) parts of sodium nitrite and three hundred and eighty (380) parts of hydrochloric acid (containing about thirty per cent. H Cl.) Take such a quantity of water that about two thousand (2,000) parts of diazo solution are obtained. Run this into a suspension of two hundred and forty (240) parts of 1.8 amido-naphthol 4 sulfoacid in sixteen thousand (16,000) parts of water and four thousand (4,000) parts of ice. After a short time add two thousand (2,000) parts of sodium-acetate solution containing ten per cent. sodium acetate. Stir for about five or six hours. A test portion on paper should no longer show a yellow liquid that turns blue violet with soda. When this is the case, the production of the intermediate product may be regarded as finished. In this way the combination of the tetrazo residue containing the basic groups in the part of the amido-naphthol-sulfoacid molecule containing the amido group is effected. Next add to the liquid eight thousand parts of a solution of carbonate of soda (containing ten per cent. $Na_2CO_3$) and to the liquid so obtained add a diazo solution obtained in the well-known way from two hundred and eighty (280) parts of para-phenylene-diamin-azo-salicylic acid, four hundred and twenty (420) parts of hydrochloric acid, (containing thirty per cent. H Cl,) and sixty-nine (69) parts of sodium nitrite. Stir for twelve hours. The formation of the coloring-matter will then be finished. Warm up to about 75° to 80° and stir in eight thousand (8,000) parts of common salt. The coloring-matter is precipitated. Filter, press, and dry.

In the foregoing example I have described the method of introducing tetrazo residues in the desired manner into the amido-naphthol-sulfoacid by first combining in acid solution. In this way the tetrazo residue employed is introduced into that part of the amido-naphthol-sulfoacid which contains the amido group, while the part containing the hydroxyl group remains unchanged. The introduction of the second tetrazo residue can best be effected by combination in alkaline solution, as illustrated; but it can also be carried in neutral or even weakly acid solution, if desired. It is possible to first introduce the tetrazo residue containing the hydroxyl groups into the part of the amido-naphthalene-sulfoacid containing the hydroxyl group by combination, in the first instance, in alkaline solution. Then the introduction of the second tetrazo residue containing the amido groups can be effected as desired; but the method illustrated by the example is that which is recommended.

My new group of coloring-matters are all characterized by the following properties: They are dark-colored powders soluble in hot water and dye cotton goods giving black shades without the aid of a mordant. A dilute solution of the coloring-matters containing one (1) part coloring-matter in about one thousand (1,000) parts of water rendered alkaline with carbonate of soda is violet to blue in color. On treating such a solution with diazo-sulfanilic acid the coloring-matter is decomposed and the color of the solution turns toward brown.

The coloring-matter which I desire to claim specifically possesses the constitution hereinbefore shown in the formula, and is characterized by all the generic properties appertaining to my new group of dyes. Its aqueous solution is reddish blue to blue, while its solution in concentrated sulfuric acid is blue.

Now what I claim is—

The new coloring-matters which can be derived from amido-naphthol-monosulfoacid (1.8.4; 1.8.5.) and a tetrazo residue containing one or more basic groups attached to the part of the amido-naphthol-sulfoacid residue which contains the amido group, and a tetrazo residue containing one or more hydroxyl groups attached to the part of the amido-naphthol-sulfoacid residue which contains the hydroxyl, and which is characterized by dyeing cotton goods yielding black shades without the aid of a mordant, and yielding a violet to blue solution in water rendered alkaline with carbonate of soda, in which the coloring-matter is decomposed by the addition of diazo-sulfanilic acid, all substantially as described.

In testimony whereof I have hereunto set my hand in the presence of two subscribing witnesses.

GEORG KOERNER.

Witnesses:
OSCAR BALLY,
GUSTAV L. LICHTENBERGER.